March 30, 1954     G. B. DOYLE, JR     2,673,762
SOLVENT RESERVOIR FOR WINDSHIELD WASHER APPARATUS
Filed April 17, 1953     2 Sheets-Sheet 1
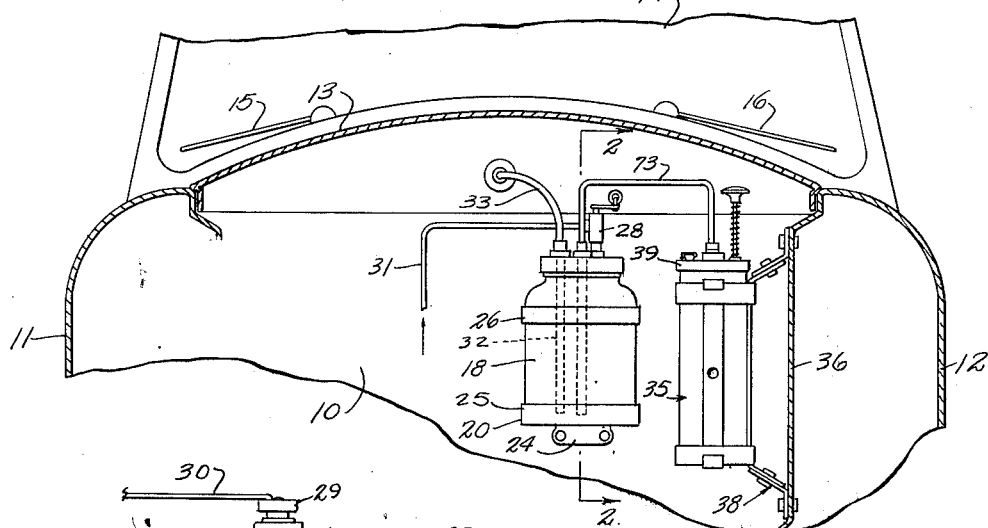
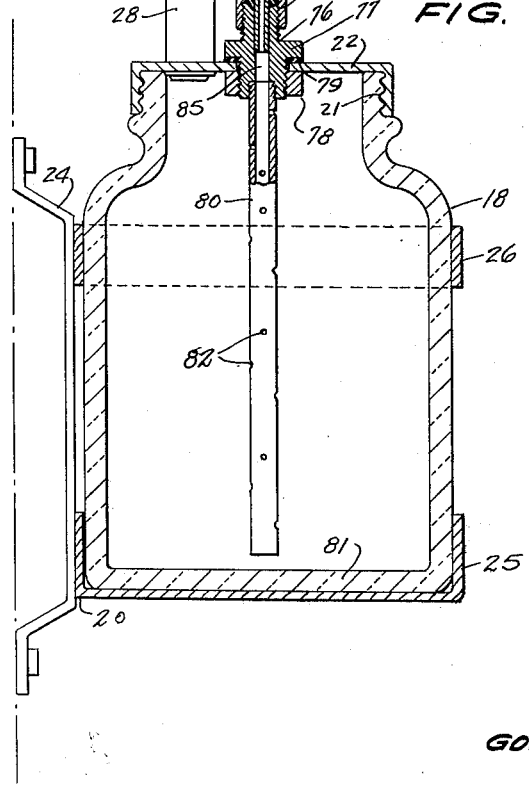
INVENTOR.
GORDON B. DOYLE, JR.
BY
McMorrow, Berman + Davidson
ATTORNEYS.

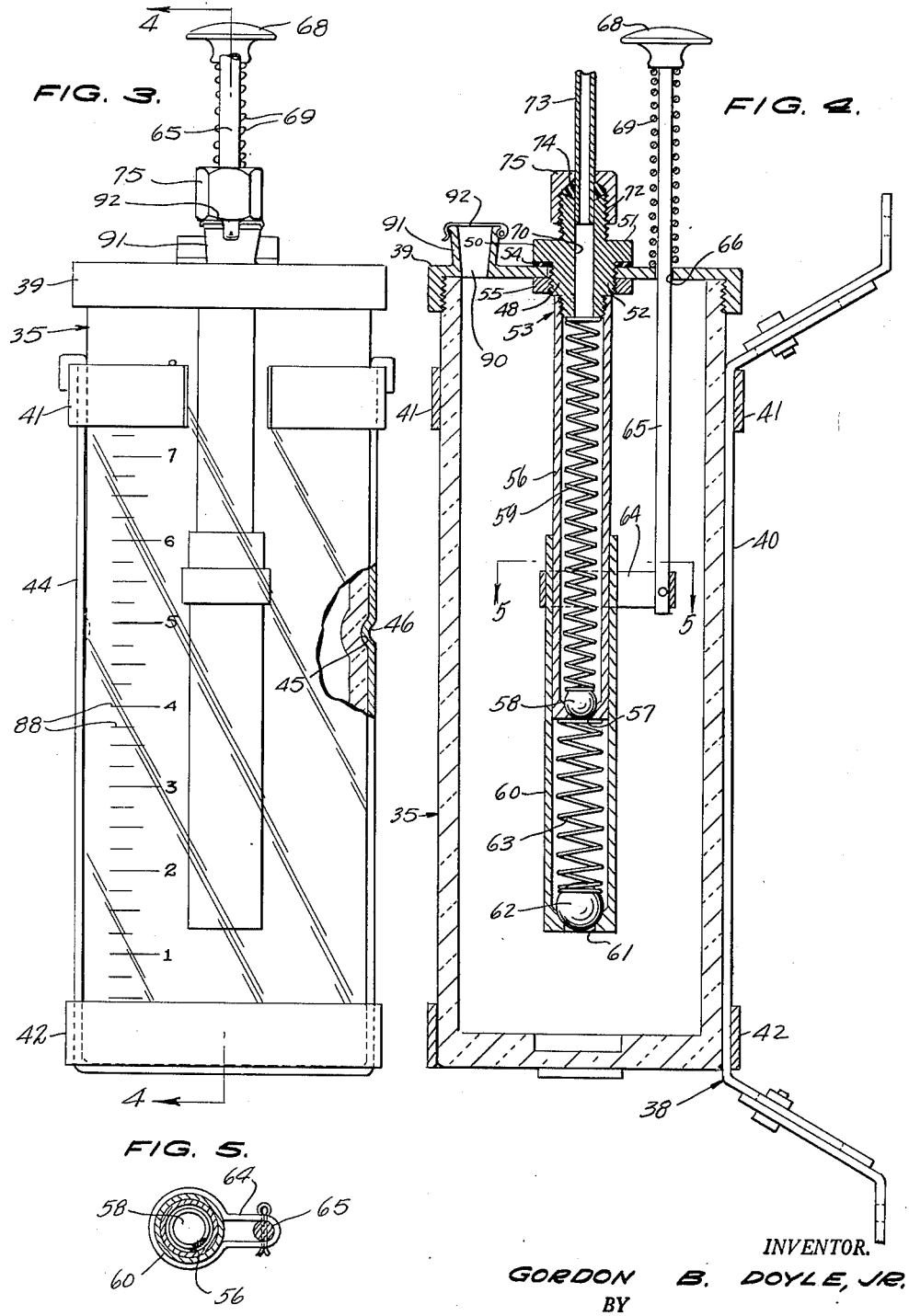

Patented Mar. 30, 1954

2,673,762

UNITED STATES PATENT OFFICE 2,673,762

SOLVENT RESERVOIR FOR WINDSHIELD WASHER APPARATUS

Gordon Bennett Doyle, Jr., College Park, Md.

Application April 17, 1953, Serial No. 349,429

2 Claims. (Cl. 299—84)

This invention relates to windshield washing apparatus carried by an automobile and associated with the windshield wiper mechanism of the automobile and more particularly to windshield washing apparatus including a water reservoir and a solvent or detergent reservoir connected to the water reservoir in a manner such that solvent or detergent can be dispensed in major quantities from the solvent reservoir into the water reservoir.

It is among the objects of the invention to provide improved windshield washing apparatus mounted in the engine compartment of the associated automobile and connected to a source of air under pressure operated by the associated engine to spray water on the associated windshield in cooperation with the windshield wiper mechanism to wash the windshield of the automobile; which includes a bottle or reservoir for a solution of water and a suitable solvent or detergent and a solvent or detergent reservoir mounted on the automobile structure adjacent the water reservoir; which includes a manually operated pump associated with the solvent reservoir and connected to the water reservoir for dispensing solvent from the solvent reservoir into the water reservoir and means on the solvent reservoir for measuring the quantity of solvent dispensed; which includes means for refilling the solvent reservoir when necessary; and which is simple and durable in construction, economical to manufacture, and easy to install.

Other objects and advantages will become apparent from a consideration of the following description and the appended claims in conjunction with the accompanying drawings, wherein:

Figure 1 is a somewhat diagrammatic cross sectional view of the front end portion of an automobile showing windshield washing apparatus mounted on the fire wall of the automobile and including a water reservoir and a solvent reservoir connected to the water reservoir;

Figure 2 is a cross sectional view on an enlarged scale on the line 2—2 of Figure 1;

Figure 3 is a side elevational view on an enlarged scale of the solvent reservoir;

Figure 4 is a cross sectional view on the line 4—4 of Figure 3; and

Figure 5 is a cross sectional view on the line 5—5 of Figure 4.

With continued reference to the drawings, the portion of the automobile fragmentarily illustrated includes the automobile fire wall 10, front fenders 11 and 12 disposed at respectively opposite sides of the fire wall and extending forwardly therefrom, a hood 13 extending between the upper edges of the fenders 11 and 12 and forwardly from the upper edge of the fire wall, and a windshield 14 mounted on and extending transversely of the automobile above the fire wall 10. Suitable windshield wiper mechanism including the wiper blades 15 and 16, is mounted on the vehicle with the blades disposed at the outer side and lower edge of the windshield and windshield washing apparatus is mounted in the engine compartment of the vehicle ahead of the fire wall 10 and between the fenders 11 and 12 and associated with the wiping mechanism to spray water on the front or outer side of the windshield which can be wiped over the surface of the windshield by the wiper blades to clean the windshield in a manner well known to the art.

The windshield washing apparatus includes a bottle or jar 18 mounted on the front side of the fire wall 10 by a bracket 20 and constituting a reservoir for the water for washing the windshield. The jar 18 may be a glass jar of cylindrical shape having an externally screw threaded neck 21 of reduced diameter and a cover 22 of sheet metal having an internally screw threaded marginal flange surrounding and threadedly engaging the neck 21 of the bottle. The bracket 20 may include a cleat 24 mounted in upright position on the fire wall 10 and having its intermediate portion spaced forwardly of and substantially parallel to the fire wall, a cup-shaped platform 25 secured to the cleat 24 near the lower end of the cleat and projecting substantially perpendicularly outwardly from the cleat and a band 26 secured to the cleat near the upper end of the cleat and projecting perpendicularly outwardly therefrom, the platform 25 and band 26 receiving the jar or bottle 18 and securely supporting the jar in position on the fire wall of the automobile.

A valve 28 is mounted on and extends above the cap 22 in communication with the interior of the bottle 18 and has at its upper end an operating arm 29 connected by a link 30 extending through the vehicle fire wall 10 to a manual control knob for opening and closing the valve. A conduit 31 leads from the valve 28 to a suitable source of air under pressure, such as an air pump mounted on the fuel pump of the associated automobile engine for supplying air under pressure to the interior of the jar 18 when the valve 28 is manually opened. A tube 32 is disposed in upright position in the jar 18 and extends from a location near the bottom of the jar through the cap 22 and a flexible conduit 33 connects the upper end of this tube to the spray nozzles disposed adjacent the pivotal mountings of the windshield wiper blades 15 and 16 to apply sprays of water to the outer surface of the windshield adjacent the wiper blades, as is well known.

As the construction of the automobile, the windshield wiper mechanism and the windshield washing apparatus may be any of several forms well known to the art, a more detailed illustration and description of these parts is considered unnecessary for the purposes of the present disclosure.

A solvent or detergent reservoir, generally indicated at 35, is mounted on the autmobile structure, such as the inner wall 36 of the fender 12, by a suitable bracket, generally indicated at 38, and has its open, upper end closed by a cup-shaped cap 39 threaded onto the externally screw threaded upper end portion of the reservoir.

As illustrated in Figures 3 and 4, the reservoir 35 is preferably a substantially cylindrical container of a transparent material, such as glass or a synthetic rosin plastic, and is of a size to hold a predetermined quantity of liquid solvent or detergent, a reservoir having a capacity for eight ounces of lquid having been found to provide satisfactory results in use.

The bracket 38 comprises a U-shaped cleat 40, the legs of which are adjustable in length and secured at their distal ends to the fender wall 36 so that the cleat is disposed in upright position with its intermediate portion spaced inwardly from and substantially parallel to the fender side wall. Cylindrical bands 41 and 42 are secured to the intermediate portion of the cleat at the upper and lower ends of this intermediate portion respectively and extend perpendicularly outwardly from the cleat and closely receive the reservoir 35. A U-shaped clamp 44 has its intermediate or bight portion extending diametrically of the lower band 42 at the lower edge of this band and its legs at its open end secured to the band 41 at diametrically opposite locations around the upper band 41. The reservoir or receptacle 35 is disposed between the parallel legs of the clamp 44 and is provided with recesses, as indicated at 45, disposed medially of the length of the receptacle and at diametrically opposite locations therearound and each leg of the clamp is provided with a detent formation 46 resiliently engaged in the corresponding depression in the receptacle to resiliently clamp the receptacle in the bracket 38.

The receptacle cover 39 is provided with a central opening 48 and an externally screw threaded, stepped fitting 50 is mounted in this central opening and has an annular flange portion 51 overlying the cover around the opening 48, a screw threaded portion 52 extending from the flange through the opening in the cover and an externally screw threaded end portion 53 of reduced diameter extending from the end of the portion 52 remote from the flange 51. A gasket 54 is disposed between the flange 51 and the cover 39 and a nut 55 is threaded onto the portion 52 of the fitting at the under side of the cover 39 and compresses the gasket 54 between the flange and the cover to provide a fluid tight seal between the fitting and the cover.

A tube 56 is threaded at its upper end onto the screw threaded end portion 53 of the fitting and extends downwardly from the cover 39 into the receptacle 35, this tube being provided at its lower end with a restricted opening 57 and a valve seat surrounding this opening. A valve ball 58 is disposed in the tube 56 for cooperation with the valve seat at the lower end of the tube and a compression spring 59 extends longitudinally through the tube and resiliently urges the ball 58 against the associated annular valve seat. A second tube 60 slidably receives the lower portion of the tube 56 and has at its lower end a restricted opening 61 surrounded by a valve seat and a valve ball 62 is disposed in the tube 60 for cooperation with the annular valve seat surrounding the opening 61. A compression spring 63 extends longitudinally of the tube 60 between the valve ball 62 and the adjacent end of the tube 56 and resiliently urges the valve ball 62 into engagement with the valve seat surrounding the opening 61 in the lower end of the tube 60. A bracket 64 is secured to the tube 60 near the upper end of this tube and projects radially from the tubes 60 and 56 and a rod 65 extends slidably through an opening 66 in the cover 39 and is secured at its lower end to the bracket 64 at a location spaced laterally from the tube 60.

The rod 65 extends above the reservoir cover 39 and a hand knob 68 is secured on the upper end of this rod. A compression spring 69 surrounds the rod 65 between the knob 68 and the upper surface of the cover 39 and resiliently urges the rod to its upper limiting position relative to the cover.

The tubes 56 and 60 together with the check valves including the valve balls 58 and 62 constitute a pump for pumping liquid from the interior of the receptacle 35 through the bore 70 of the fitting 50. When the knob 68 is manually depressed against the force of spring 69 the tube 60 is forced downwardly in the receptacle 35 and liquid in the receptacle enters this tube through the opening 61 and past the valve ball 62 filling or partly filling the interior of the tube. When the pressure on the knob 68 is released the spring 69 forces the rod 65 and the tube 60 upwardly and the liquid trapped in the tube 60 by the closing of the valve ball 62 with its associated seat is now forced through the opening 57 in the lower end of the tube 56 and past the valve ball 58 into the tube 56. As soon as the tube 56 is filled liquid is then forced from this tube upwardly through the bore 70 of the fitting 50.

Above the flange 51 the fitting 50 is provided with an externally screw threaded portion 72 of reduced diameter and a tubular conduit 73 has one end inserted into the upper end of the bore 70 in the fitting portion 72. A packing 74 surrounds the conduit 73 at the upper end of the fitting portion 72 and a gland nut 75 threaded onto the fitting portion 72 compresses the packing 74 around the conduit 73 and provides a fluid tight seal between the conduit and the fitting 50.

The cover 22 of the water receptacle 18 is provided with an opening and a stepped fitting 76 has a screw threaded portion extending through this opening and an annular flange 77 overlying the cover 22 surrounding the fitting receiving opening therein. A nut 78 is threaded onto the fitting below the cover 22 and compresses an annular gasket 79 between the flange 77 and the adjacent portion of the cover 22 and a tube 80 is threaded at its upper end into the lower end of the fitting 76 and extends downwardly from the fitting 76 substantially to the bottom wall 81 of the receptacle 18. This tube is closed at its lower end and is provided in its side wall with apertures or orifices 82 spaced apart longitudinally of the tube so that liquid solvent flowing from this tube into the receptacle 18 will be uniformly dispersed through the water contained in the receptacle.

Above the flange 77 the fitting 76 is provided with an externally screw threaded portion 84 of reduced diameter and the other end of the conduit 73 is inserted into the upper end portion of the bore 85 within the portion 84 of the fitting 76. A packing 86 surrounds the conduit 73 at the upper end of the fitting portion 84 and a gland nut 87 is threaded onto the fitting portion 84 and compresses the packing 86 around the conduit 73 to provide a fluidtight seal between the conduit and the fitting.

With this arrangement, the liquid forced upwardly through the tube 56 by the above described pump action and through the fitting 50 is forced through the conduit 73 and the fitting 76 into the tube 80 in the water receptacle 18 and ejected through the orifices 82 in the tube 80 into the water contained in the receptacle 18.

The solvent receptacle 35 is provided on the outer side thereof with a series 88 of graduations uniformly spaced apart longitudinally of the receptacle and accurately indicating the liquid contents of the receptacle in ounces. By observing the movement of the liquid level in the receptacle 35 downwardly past the graduations 88 the operator can determine exactly how much liquid solvent or detergent is pumped from the solvent reservoir 35 into the water reservoir 18.

The solvent reservoir cover 39 is provided with a third opening 90 surrounded at the upper side of the cover by a filler spout 91 through which the supply of solvent in the reservoir 35 can be replenished when necessary and a cover 92 is hinged to the filler spout 91 at the upper end of the spout and movable into and out of closing relationship with the upper end of the filler spout.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an automobile windshield washing apparatus including a water reservoir having a top, a solvent reservoir disposed adjacent said water reservoir and having a top, a tube disposed in said water reservoir and extending through the top thereof, a manually operated pump disposed in said solvent reservoir and extending through the top thereof, and conduit means connecting said pump to said tube for the dispensing of solvent from said solvent reservoir into said water reservoir by operation of said pump, said solvent reservoir being of transparent material and having graduation marks uniformly spaced apart longitudinally thereof and indicating the liquid content of said reservoir in ounces whereby an operator can determine the amount of liquid pumped from said solvent reservoir into said water reservoir by observing the passage of the liquid level in said solvent reservoir past said graduation marks.

2. In combination with an automobile windshield washing apparatus including a water reservoir having a top, a solvent reservoir disposed adjacent said water reservoir and having a top, a tube disposed in said water reservoir and extending through the top thereof, a manually operated pump disposed in said solvent reservoir and extending through the top thereof, and conduit means connecting said pump to said tube for the dispensing of solvent from said solvent reservoir into said water reservoir by operation of said pump, said tube disposed in the water reservoir extending from the top of the water reservoir substantially to the bottom thereof and having its lower end closed and apertures in its side wall spaced apart longitudinally thereof to uniformly distribute the liquid solvent pumped from said solvent reservoir into said water reservoir through the water contained in said water reservoir.

GORDON BENNETT DOYLE, JR.

References Cited in the file of this patent
UNITED STATES PATENTS

| Number | Name | Date |
| --- | --- | --- |
| 150,830 | Collier | May 12, 1874 |
| 779,923 | Gillett | Jan. 10, 1905 |
| 1,304,746 | Dingle | May 27, 1919 |
| 2,105,676 | Stow | Jan. 18, 1938 |
| 2,289,650 | Horton | July 14, 1942 |